United States Patent [19]

Eichler

[11] 4,167,900
[45] Sep. 18, 1979

[54] SANDWICH GRILL

[76] Inventor: Edwin H. Eichler, R.F.D. Box M-30, Del Mar, Calif. 92014

[21] Appl. No.: 875,437

[22] Filed: Feb. 6, 1978

[51] Int. Cl.² .............................................. A47J 37/06
[52] U.S. Cl. ...................................... 99/332; 83/681; 99/343; 99/375; 100/226
[58] Field of Search ................. 99/374, 372, 375, 376, 99/342, 343, 332, 377, 379, 380, 381; 116/133; 100/98 R, 226; 30/114, 302; 83/681, 682

[56] References Cited

U.S. PATENT DOCUMENTS

| 1,742,945 | 1/1930 | Banff | 99/376 |
| 2,078,189 | 4/1937 | Bemis | 99/375 |
| 2,358,452 | 9/1944 | Garstang | 99/376 |
| 2,463,439 | 3/1949 | Strietelmeier | 99/375 |
| 2,587,314 | 2/1952 | Hall | 99/375 |
| 3,068,778 | 12/1962 | Mejerus | 99/375 |
| 3,121,385 | 2/1964 | Funke | 99/374 |

Primary Examiner—Billy J. Wilhite
Attorney, Agent, or Firm—Brown & Martin

[57] ABSTRACT

A sandwich grill includes a base support housing having a vertical support member supporting a fixed die and a movable die disposed for cooperative opposed relationship for confining a sandwich therebetween. The dies include shearing elements for shearing excess sandwich material from the dies and are supported on arms that also provide shearing action for shearing the material to permit it to drop into a scrap or waste tray disposed beneath the dies. The dies are heated by electrical heating elements connected in a control circuit including thermostatic and timing controls for selecting temperature and time on the grill. The movable die is operated by a lever and cam arrangement which moves the movable die in a vertical path and then in a pivotal path for moving the die vertically away from the fixed die and pivoting backwards out of the way. The dies are removably attached to the device and may provide for the selective replacement of the dies of any selected configuration, such as that of a fish as shown in an alternate embodiment.

9 Claims, 9 Drawing Figures

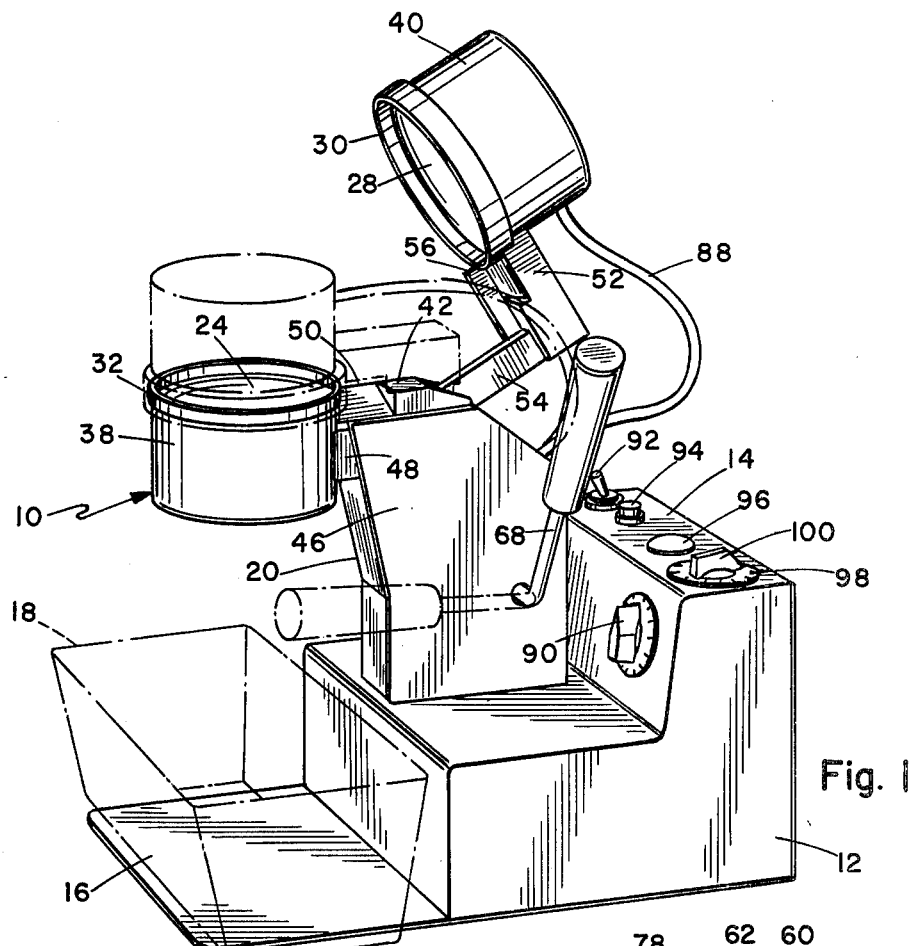
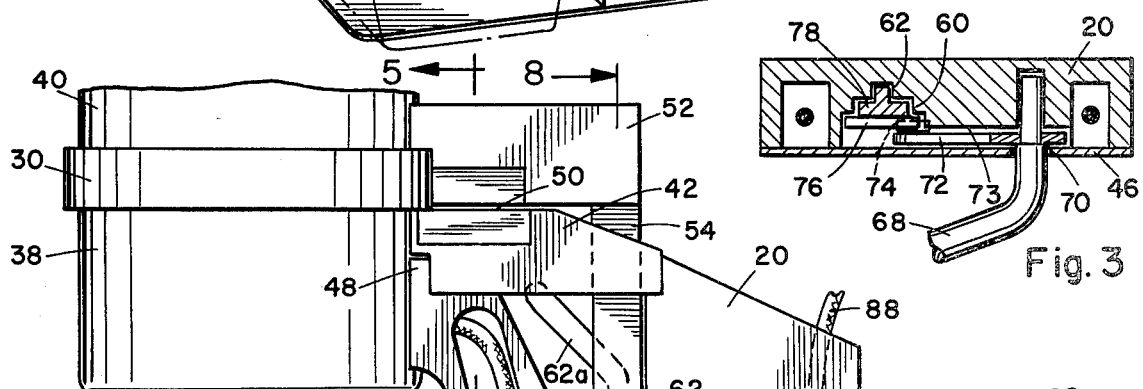
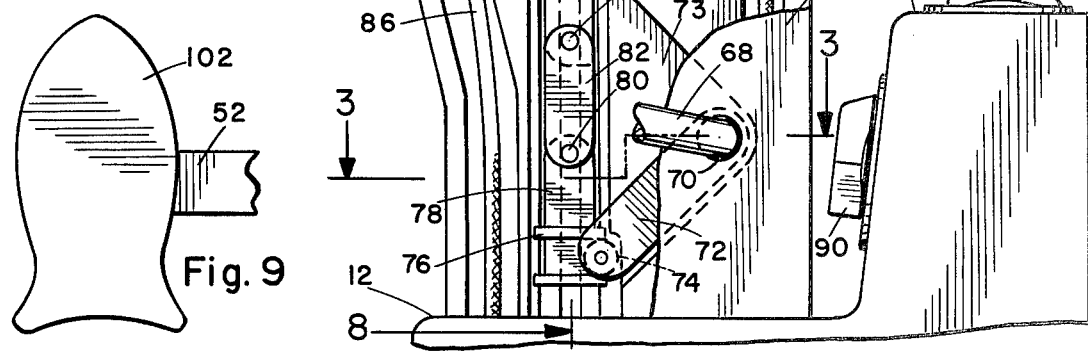

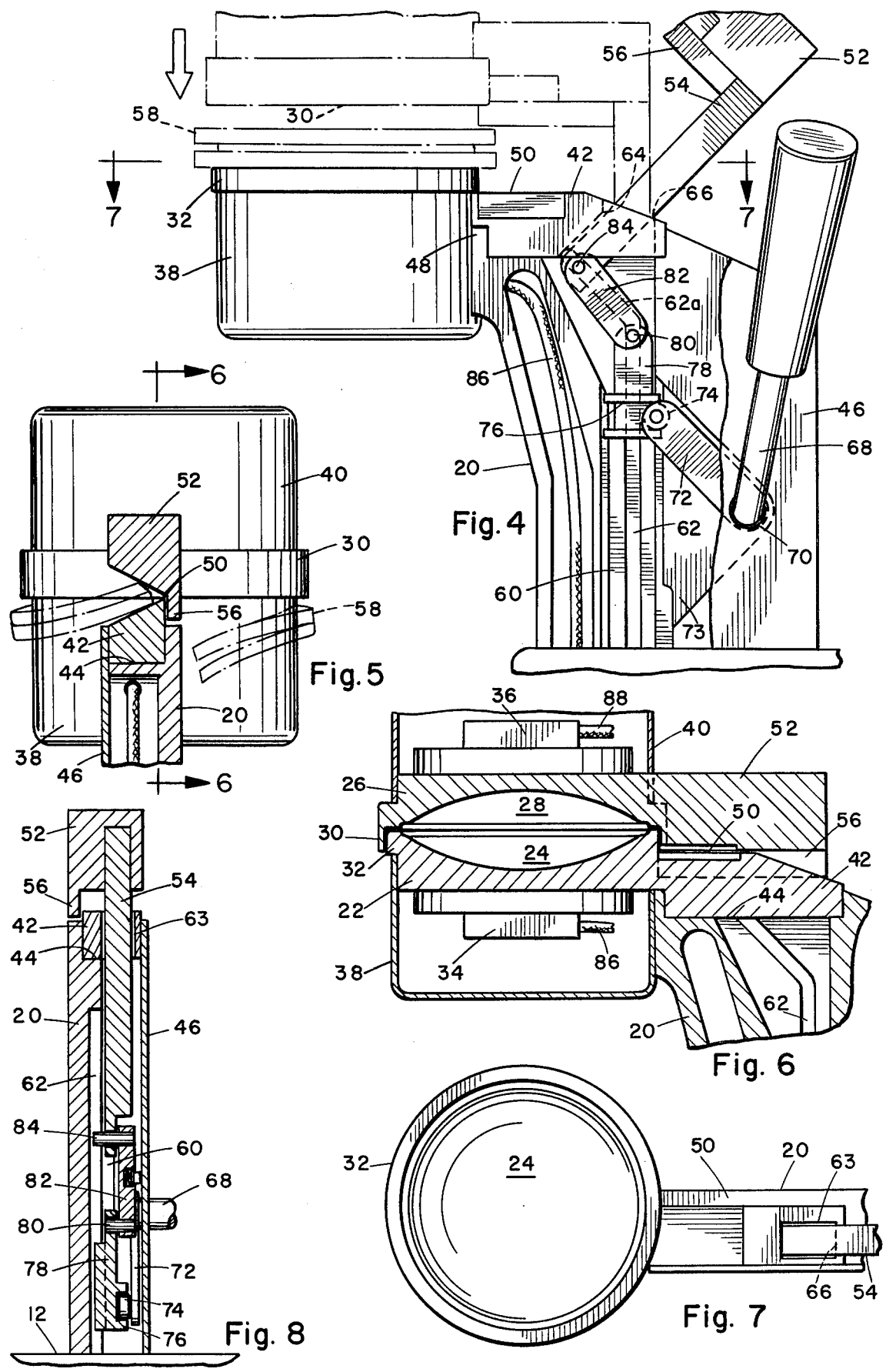

4,167,900

SANDWICH GRILL

BACKGROUND OF THE INVENTION

The present invention relates to sandwich grills and pertains particularly to a grill for making filled, toasted sandwiches or the like.

Filled, toasted sandwiches are quite popular in this country today, especially in fast food restaurants. Such sandwiches are typically grilled between opposing faces or dies of a grill. A number of different grill constructions are available. These however have some drawbacks. Among the prior art sandwich grills available today are those shown for example in U.S. Pat. No. 2,463,439 issued Mar. 1, 1949 to Strietelmeier and U.S. Pat. No. 2,587,314 issued Feb. 26, 1952 to Hall. The former patent discloses simply a pair of dies hinged together for encompassing and holding the portions of a sandwich together during the heating process. In the Hall disclosure, however, the sandwich grill is mounted on a base member with operating mechanism for pivoting one of the plates toward and away from the other plate. The device includes electrical heating elements in the sandwich dies or mold plates. While these are both satisfactory in many respects, these are not suitable for high speed production.

While the Hall device may provide for the severance of excess sandwich material from that contained within the dies, such materials such as bread or crust or the like, will be severed from around the sandwich, however, will tend to catch and hand on the arm 25 of the grill. Neither of these sandwich grills actually provide for the problems wherein excess sandwich material is placed between the dies. For example, it is common to use bread which exceed the size of the dies themselves. In such case, the excess bread must be severed from that contained in the die and preferably permitted to fall within a scrap container or the like below the die.

Other deficiencies of these prior art devices includes the lack of complete control over the temperature and time of the cooking, thus requiring constant attention by an attendant. Other deficiencies include the lack of means for indicating the content of the sandwich contained within the grill.

Accordingly, it is desirable that a sandwich grill be available which provides for quick and efficient removal of excess sandwich material, as well as provide simple and convenient controls for completely controlling the time and temperature applied to the sandwich without requiring the attention of an attendant. It is also desirable that such a grill be available having means for indicating the contents of the sandwich.

SUMMARY AND OBJECTS OF THE INVENTION

It is accordingly the primary object of the present invention to overcome the above problems of the prior art.

Another object of the present invention is to provide an improved sandwich grill having means for easily and conveniently severing excess sandwich material from that in the dies.

A further object of the present invention is to provide a simple and convenient sandwich grill having control means for conveniently and easily controlling temperature and time of grilling without requiring the constant attention of the attendant.

A still further object of the present invention is to provide an improved sandwich grill having improved control system including means for indicating the contents of a sandwich in the grill.

In accordance with the primary aspects of the present invention, an improved sandwich grill is provided with means for severing excess sandwich material from a material contained within the sandwich dies permitting the material to fall into scrap trays, and includes control means for controlling time and temperature of the grill automatically.

BRIEF DESCRIPTION OF THE DRAWINGS

The above and other objects and advantages of the invention will become apparent from the following description when read in conjunction with the drawings wherein:

FIG. 1 is a perspective view of the sandwich grill maker, showing the open and closed positions of the head.

FIG. 2 is a side elevational view of the head and support pillar structure partially cut away to show the mechanism in the enclosed position.

FIG. 3 is a sectional view taken on line 3—3 of FIG. 2.

FIG. 4 is a view similar to FIG. 2, but with the mechanism in the open position.

FIG. 5 is a sectional view taken on line 5—5 of FIG. 2.

FIG. 6 is a sectional view taken on line 6—6 of FIG. 5.

FIG. 7 is a plan view taken on line 7—7 of FIG. 4.

FIG. 8 is a sectional view taken on line 8—8 of FIG. 2.

FIG. 9 is a plan view on a reduced scale of an alternate configuration of the head.

DETAILED DESCRIPTION OF A PREFERRED EMBODIMENT

Turning now to FIG. 1 of the drawing, there is illustrated a sandwich grill in accordance with the preferred embodiment of the invention. In accordance with the invention, a sandwich grill designated generally by the numeral 10 comprises a base member 12 adapted to rest on a table or counter and comprising at least in part a housing for enclosing control mechanisms and circuitry and the like and further includes a control panel designated generally by the numeral 14. A waste tray platform 16 extends outward forward of the base underneath the sandwich dies or heads for receiving a waste pan or tray 18. This waste tray platform is preferably constructed of a thin sheet of metal or the like for resting on a table or counter. This construction conveniently provides for a deep waste tray and for the tray to move with the grill as it may be moved about a table or counter.

A support pillar 20 extends upward from the base 12 and mounts or supports a grill head. The grill head as best seen in FIG. 6 comprises a lower or fixed die or mold plate 22 having an upwardly opening cavity 24 and an opposing movable mold plate or die 26 having a cavity 28 and cooperatively engaging the lower mold plate or die. The upper or movable die 26 includes an annular rim 30 that extends beyond the annular edge 32 of the lower die for severing excess sandwich material contained within the mold cavity.

It is common practice to place sandwich material or the like within the mold cavity by first placing a slice of bread or layer of dough within the lower cavity filling the cavity with filler material and then covering it with a second slice of bread or layer of dough. At least the dough or bread frequently extends beyond the outer rim of the mold dies and is severed by the overlapping flange and edge 30 and 32.

The mold plates or dies are respectively heated by heating elements 34 and 36 which in turn are covered by covers 38 and 40. These heating elements are connected by suitable electrical conductors into a conventional heating circuit that will be described later.

The lower die 22 is mounted on an arm 42 which is mounted on the pillar 20 in a detachable manner such as best seen in FIG. 5 fitting within a channel 44 defined by the walls of the pillar and a cover plate 46 attached to one side thereof. A forward wall member 48 engages or abutts a forward end of the arm 42. The arm is preferably retained in place by suitable detachable fastening means such as screws or the like not shown. With this detachable arrangement, the heads or dies may be replaced by suitable or heads of a different size and shape such as for example a fish shape such as shown in FIG. 9.

A portion of the arm closely adjacent the die 22 is sloped upward to define a cutting edge 50 as best seen in FIG. 5. The upper or removable die 26 is mounted on a movable arm 52 having a downwardly extending support post 54 which is connected at its lower end to a movement mechanism as will be described. The arm 52 includes a shearing blade 56 which cooperates with the cutting edge 50 of arm 42 for severing excess sandwich materials such as surplus bread, as shown for example in phantom at 58 in FIG. 5. This severing of the ring of bread will permit the bread to fall past the arm 42 into the waste or scrap tray 18.

As best illustrated in FIGS. 1 and 4, the movable die moves away from the fixed die opening the mold or die cavity for the placement of sandwich material between the two dies. The movement of the movable die is linearly upward away from the fixed die for a short distance as shown for example in FIG. 4 and thereafter pivoting away of the movable die from over or above the fixed die. The mechanism for accomplishing this movement of the movable die is incorporated within a housing defined by the pillar 20 and the cover plate 46 covering a series of cavities and channels within the support pillar 20. The mechanism includes a parallel or coextensive arrangement of a slide channel 60 and a cam track 62 extending vertically of the support pillar 20. The slide track opens into a generally triangular shaped area at the upper end thereof permitting lateral movement of the lower end of the support post 54. The cam track 62 extends vertically along the slide channel 60 and just past the upper end thereof curves or angles outward defining an angled extension 62a.

The support post 54, as best seen in FIG. 4, extends beyond the upper end of the housing and outward of a slot 63 defining a pair of opposed fulcrum edges 64 and 66 on opposite sides of the support post 54. This provides fulcrum for pivoting the arm and die toward and away from the fixed arm and die. An operating lever 68 is pivotally mounted to one side of the support pillar 20 in a bore 70 in cover 46, and includes an arm 72 mounted within a triangular cutout 73 in support post or pillar 20. This arm 72 is connected by a roller and pin combination 74 within a yoke 76 of a slider 78 which in turn is mounted in slide channel 60 and cam track 62. The slide 78 is connected by a pivot pin 80 at its upper end to a link 82 which in turn is connected by a pivot and cam follower pin 84 to the lower end of support post 54. The cam follower pin 84 extends through a bore in the support post 54 and into the cam track 62 and, as best seen in FIG. 4, by virtue of this arrangement follows the cam track extension 62a out of vertical alignment with main track 62 for pivoting the lower end of the support post 54 about the fulcrums 64 and 66 and tilting the upper die back. Thus a simple movement of the actuating lever 68 between the upper and lower positions, as shown in FIG. 1, moves the upper sandwich die vertically into and out of position in cooperative position with the lower die. The actuating linkage in combination with the lever 68 provides a combination linear and pivotal movement of the upper die for quick and continued movement of the die into and out of position with respect to the fixed die.

The sandwich dies are each heated by suitable electrical heating elements as previously discussed, which are connected into a suitable electrical circuit. The circuit, not shown, includes conductor wires 86 and 88 connected to the respective heating elements and through a timing mechanism controlled by a selective control or knob 90 with the circuit, which connects also by way of a power off and on switch 92 to a source of electrical current. The circuit also includes indicator lights 94, 96 for indicating power on and completion of the cooking cycle.

A suitable sandwich selection indicator comprises a scale 98 and a selector arm pointer knob 100. The scale may be marked in numbers or letters and the restaurant menu correspondingly coded such that when a sandwich is placed within the grill, the dial is set to the corresponding number on the menu for example a roast beef sandwich may be indicated at number 1 and the dial set accordingly. The desirability of this indicator will be appreciated from the fact that the sandwich when completed is completed enclosed by a layer of bread or crust with the edges thereof sealed with none of the filling visible from externally thereof. Accordingly, when a sandwich is in the grill or once it has been placed in the grill, it is possible without cutting it open to tell what filler is in the sandwich. Accordingly, the dial provides an indication of the contents of the sandwich. Thus, if the indicator is properly set upon loading the grill, it will provide an accurate indication of the contents of the sandwich upon opening the grill.

As previously mentioned, the sandwich molds or dies may be easily and conveniently replaced with dies of a different size and/or shape. For example, referring specifically to FIG. 9, the head and die 102 may be of a configuration such as that of a fish. Such a construction would be desirable for example for making a fish sandwich for a sea food restaurant.

While I have illustrated and described my invention by means of a particular device, it is to be understood that numerous changes and modifications may be made therein without departing from the spirit and scope of the invention, as defined in the appended claims.

I claim:
1. A sandwich grill comprising:
   a base member;
   a vertical support pillar having a vertical channel therein secured to and extending upward from said base member;
   a first sandwich die mounted on a first arm secured to and extending outwardly from said vertical support pillar;

a second sandwich die mounted on a second arm including a downwardly extending support post slidably mounted in said channel in said vertical support pillar;

a cam track disposed adjacent said channel and having a main vertical portion and an angled extension;

a guide pin mounted in the lower end of said support post and engaging said cam track for guiding said lower end of said support post in a linear vertical path for moving said second die in a linear path toward and away from said first die, and an angled path for tilting said second die toward and away from said first die;

operating means mounted on said vertical support pillar and connected to said support post for moving said post along said channel for moving said second die along said linear vertical path and said angled path into and out of cooperative engagement with said first die for engaging and enclosing sandwich material therebetween; and heating means in said first and said second dies for applying heat thereto.

2. The sandwich grill of claim 1 wherein said operating means comprises a lever pivotally mounted on said pillar and including an arm connected to a slide member mounted in said track and connected to said guide pin.

3. The sandwich grill of claim 2 wherein said heating means includes an electrical heating element;
an electrical circuit connecting the heating elements to a source of electrical current;
temperature control means in said circuit for controlling the temperature of said dies.

4. The sandwich grill of claim 3 including timing means in said circuit for selectively setting the duration of the heating of said dies.

5. The sandwich grill of claim 3 including selective indicator means for selectively indicating the type sandwich in the grill.

6. The sandwich grill of claim 1 wherein said base member includes a waste tray platform.

7. The sandwich grill of claim 1 wherein said dies are detachably mounted on said vertical support pillar.

8. The sandwich grill of claim 7 wherein said dies are in the general shape of a fish.

9. The sandwich grill of claim 1, including shearing means defined by overlapping edges of said first and said second dies for shearing sandwich material extending beyond said dies, and second shearing means defined by overlapping edges of said first and second arms for shearing sandwich material extending between said arms when said arms overlap upon cooperative engagement between said first and second dies.

* * * * *